United States Patent
Narayana Gowda et al.

(10) Patent No.: US 12,056,527 B2
(45) Date of Patent: Aug. 6, 2024

(54) INVOCATION CALLS ENABLING APPLICATIONS TO INITIATE REACTIVE ACTIONS IN RESPONSE TO RESOURCE STATE CHANGES OF ASSETS

(71) Applicant: EMC IP Holding Company LLC, Hopkinton, MA (US)

(72) Inventors: Shivasharan Dalasanur Narayana Gowda, Kolar (IN); Prashant Pokharna, Ajmer (IN); Sunil Kumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 669 days.

(21) Appl. No.: 17/189,441

(22) Filed: Mar. 2, 2021

(65) Prior Publication Data
US 2022/0283862 A1    Sep. 8, 2022

(51) Int. Cl.
*G06F 9/50* (2006.01)
*G06F 9/54* (2006.01)

(52) U.S. Cl.
CPC ......... *G06F 9/5011* (2013.01); *G06F 9/5077* (2013.01); *G06F 9/542* (2013.01)

(58) Field of Classification Search
None
See application file for complete search history.

(56) References Cited

U.S. PATENT DOCUMENTS

| | | | |
|---|---|---|---|
| 9,887,889 B1* | 2/2018 | Dippenaar | H04L 43/20 |
| 2012/0221739 A1* | 8/2012 | Schroeder, Jr. | H04L 65/1016 |
| | | | 709/229 |
| 2018/0083941 A1* | 3/2018 | Thakkar | H04L 63/08 |
| 2018/0302266 A1* | 10/2018 | Makovsky | H04L 41/22 |
| 2020/0250116 A1* | 8/2020 | Bhatia | H04L 41/0213 |

OTHER PUBLICATIONS

Lamba, Anil. "API Design Principles & Security Best Practices—Accelerate your business without compromising security." Cybernomics 1, No. 3 (2019): 21-25. (Year: 2019).*

(Continued)

*Primary Examiner* — Frank D Mills
(74) *Attorney, Agent, or Firm* — Ryan, Mason & Lewis, LLP (57) ABSTRACT

An apparatus comprises a processing device configured to register one or more applications to receive resource state change invocation calls from one or more assets of an information technology infrastructure, to detect resource state changes for the one or more assets of the information technology infrastructure, and to provide, from a given one of the one or more assets of the information technology infrastructure to a given one of the one or more applications, a given resource state change invocation call responsive to detecting one or more resource state changes for the given asset. The processing device is also configured to receive, from the given application, an instruction to initiate one or more reactive actions based at least in part on the detected one or more resource state changes for the given asset, and to apply at least one of the one or more reactive actions to the given asset.

20 Claims, 8 Drawing Sheets

(56) References Cited

OTHER PUBLICATIONS

Qiao, Zhi, et al. "Incorporate proactive data protection in ZFS towards reliable storage systems." 2018 IEEE 16th Intl Conf on Dependable, Autonomic and Secure Computing, 16th Intl Conf on Pervasive Intelligence and Computing. IEEE, 2018. (Year: 2018).*
IBM, "Common Information Model User's Guide," z/OS, Version 2, Release 1, SC34-2671-00, 2013,406 pages.
Dell Technologies, "Powerpath Family: PowerPath and PowerPath/VE Multipathing," Data Sheet H15851.6, 2020, 3 pages.
Dell Technologies, "Dell EMC VPLEX," Data Sheet H7070.13, 2020, 3 pages.
Dell Technologies, "Dell EMC Storage Resource Manager (SRM)," Data Sheet H12350.6, 2020, 3 pages.
Dell EMC, "Dell EMC VIPR Controller," Data Sheet H11750.3, 2017, 2 pages.
Dell Technologies, "AppSync," Data Sheet H11078.7, 2020, 3 pages.
Dell EMC, "Dell EMC RecoverPoint" Data Sheet H2769, Sep. 2016, 4 pages.
Dell Technologies, "Dell EMC PowerStore," Data Sheet H18234.10, 2021, 4 pages.
Dell Technologies, "Dell EMC PowerMax," Data Sheet H18891.8, 2021, 5 pages.

* cited by examiner

HOST STORAGE RESOURCE INVOCATION PAYLOAD

```
{
  "serial_id":"xxxxx",
  "key":"xxxxxxxx",
  "state_changes":[
    {
      "operation":"migrate",
      "resource_type":"volume_group",
      "resource_ids":{"id1","id2","id3"}
    },
    {
      "operation":"delete",
      "resource_type":"clone",
      "resource_ids":{"id4"}
    }
  ]
}
```

INVOCATION CALLS ENABLING APPLICATIONS TO INITIATE REACTIVE ACTIONS IN RESPONSE TO RESOURCE STATE CHANGES OF ASSETS

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. The applications may further enable management of the storage systems or resources thereof. Collectively, the applications and storage systems may provide an integrated storage solution ecosystem for end-users.

SUMMARY

Illustrative embodiments of the present disclosure provide techniques for generating and sending resource state change invocation calls from assets to applications to enable the applications to initiate reactive actions in response to resource state changes of the assets.

In one embodiment, an apparatus comprises at least one processing device comprising a processor coupled to a memory. The at least one processing device is configured to perform the steps of registering one or more applications to receive resource state change invocation calls from one or more assets of an information technology infrastructure, detecting resource state changes for the one or more assets of the information technology infrastructure, and providing, from a given one of the one or more assets of the information technology infrastructure to a given one of the one or more applications, a given resource state change invocation call responsive to detecting one or more resource state changes for the given asset. The at least one processing device is also configured to perform the steps of receiving, from the given application, an instruction to initiate one or more reactive actions based at least in part on the detected one or more resource state changes for the given asset, and applying at least one of the one or more reactive actions to the given asset.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
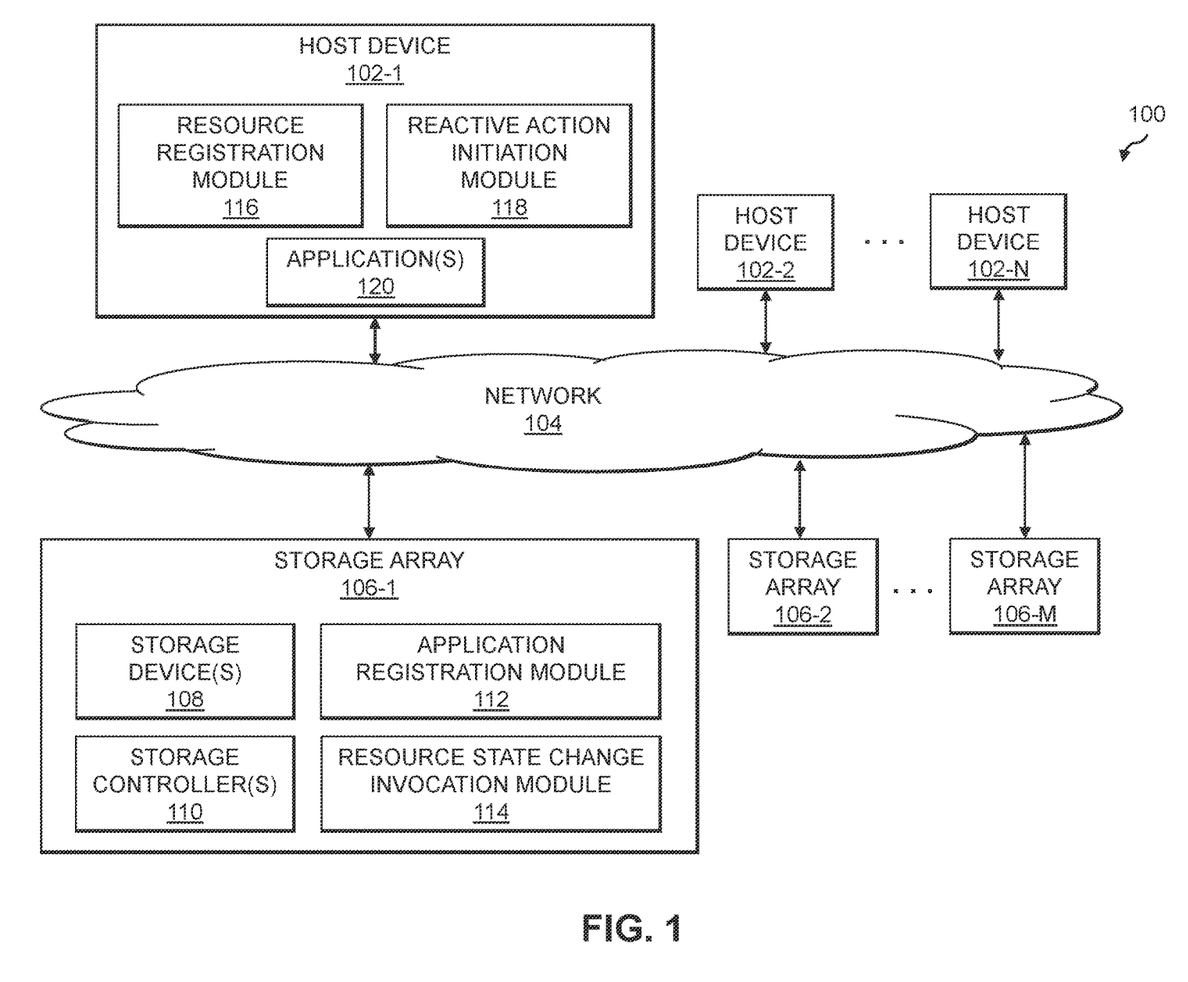
FIG. 1 is a block diagram of an information processing system configured for providing resource state change invocation calls from assets to applications to enable the applications to initiate reactive actions in response to resource state changes of the assets in an illustrative embodiment.

FIG. 1 shows an information processing system 100 configured in accordance with an illustrative embodiment to provide functionality for generating and sending resource state change invocation calls from assets to applications to enable the applications to initiate reactive actions in response to resource state changes of the assets. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The information processing system 100 may be viewed as providing at least a portion of what is referred to elsewhere herein as an "ecosystem." For example, the information processing system 100 may provide at least a portion of a storage ecosystem that includes the storage arrays 106, as well as various software that runs on the storage arrays 106 and/or host devices 102 (e.g., applications 120) to provide an integrated storage solution for end-users. Consider, as an example, that one or more of the host devices 102 runs applications (e.g., applications 120 on host device 102-1) that manage storage provided by the storage arrays 106. Such applications, combined with the storage arrays 106 themselves, provide a storage ecosystem. As described in further detail elsewhere herein, it is desirable to build a reactive model into the storage or other ecosystem that enables invocation of such ecosystem applications in response to storage resource state changes. In the FIG. 1 embodiment, such functionality is enabled though an application registration module 112 and resource state change invocation module 114 running on the storage array 106-1 as well as a resource registration module 116 and reactive action initiation module 118 running on the host device 102-1.

The application registration module 112 of the storage array 106-1 is configured to register one or more applications to receive invocations which are generated utilizing the resource state change invocation module 114 in response to detecting resource state changes for storage resources of the storage array 106-1. Such applications may run on one or more of the host devices 102 (e.g., applications 120 on host device 102-1), on one or more other ones of the storage arrays 106-2 through 106-M, on the storage array 106-1 itself (e.g., applications that run or execute using the storage controller 110 of the storage array 106-1), on an external server or cloud-based computing platform, etc. As part of registering a given application, the application registration module 112 may store various information such as a server or host name of an asset (e.g., a physical or virtual computing device) on which the application runs, user credentials (e.g., a username and password), and port and address information (e.g., a HyperText Transfer Protocol Secure (HTTPS) port and uniform resource identifier (URI) address) to send invocations to. The application registration module 112 registering the given application may further include saving a unique, secure key that will be utilized when sending invocations to the given application.

The resource state change invocation module 114 is configured to monitor for resource state changes (e.g., for storage resources) and to generate and send invocations to registered applications. In some embodiments, as part of registering the given application, the given application may specify which resources it wants to receive invocations for. The resource state change invocation module 114 can therefore utilize such information to determine which applications should receive which invocations (e.g., the given application may only receive invocations for resource state changes that the given applications specified when registering). In other embodiments, invocations may be sent to all registered applications, and the given application may be configured with functionality for filtering out and ignoring invocations relating to resources that are not managed by the given application. In still other embodiments, the resource state change invocation module 114 may be configured to determine which applications to send invocations to based on its own analysis of relevant registered applications.

Invocations sent to applications by the resource state change invocation module 114 may utilize a predefined format, which may be agreed upon during application registration. The predefined format may specify a particular type of application programming interface (API) and payload data format for invocations. For example, the predefined format may specify that a Representational State Transfer (REST) API should be used, and that the payload data should be in a JavaScript Object Notation (JSON) format.

The resource registration module 116 of the host device 102-1 is configured to register one or more applications with one or more of the storage arrays 106 to receive resource state change invocations. In the description below, it is assumed that the resource registration module 116 of the host device 102-1 performs registration of the applications 120 that run on the host device 102-1 with the storage array 106-1. It should be appreciated, however, that the resource registration module 116 of the host device 102-1 may also perform registration for applications that run or execute external to the host device 102-1 (e.g., on other ones of the host devices 102-2 through 102-N, on one or more of the storage arrays 106, etc.), and may perform registration with various other ones of the storage arrays 106 not just the storage array 106-1. As part of registering a given one of the applications 120, the resource registration module 116 of the host device 102-1 may generate a secure key that is provided to the storage array 106-1. This enables the reactive action initiation module 118 to validate invocation calls (e.g., a valid invocation call for the given application 120 running on the host device 102-1 from the storage array 106-1 should utilize the secure key provided to the storage array 106-1 during registration of the given application 120).

The reactive action initiation module 118 is configured to receive invocation calls from the storage array 106-1 (e.g., from the resource state change invocation module 114 thereof). The reactive action initiation module 118 is also configured to validate such invocation calls (e.g., by checking secure keys that are utilized in the invocation calls). The reactive action initiation module 118 is further configured to perform loopback call processing for validated invocation calls, to determine whether a resource state change identified in a given validated invocation call was initiated by the given application 120 to which that given validated invocation call is directed. If so, the given application 120 can ignore the given validated invocation call. Otherwise, the given application 120 can parse the given validated invocation call to determine any actions that should be initiated in response. As will be discussed in further detail below, such actions may be performed by the reactive action initiation module 118 in the given application 120 itself, or the given application 120 may initiate such actions using the reactive action initiation module 118 in one or more other applications, in the storage array 106-1, in one or more other ones of the storage arrays 106-2 through 106-M, etc.

At least portions of the functionality of the application registration module 112, the resource state change invocation module 114, the resource registration module 116 and the reactive action initiation module 118 may be implemented at least in part in the form of software that is stored in memory and executed by a processor.

Although the application registration module 112 and resource state change invocation module 114 are shown as being implemented internal to the storage array 106-1 and outside the storage controllers 110 of the storage array 106-1 in the FIG. 1 embodiment, it should be appreciated that the application registration module 112 and resource state change invocation module 114 may be implemented at least in part internal to the storage controllers 110 of the storage array 106-1. Further, the application registration module 112 and resource state change invocation module 114 may be implemented at least in part external to both the storage controllers 110 and the storage array 106-1, such as on or using an external server, a cloud-based computing platform, etc. It should also be appreciated that in some embodiments one or more other ones of the storage arrays 106-2 through 106-M may implement additional instances of the application registration module 112 and the resource state change invocation module 114 (e.g., to register applications to receive invocation calls in response to resource state changes for host storage resources of the other ones of the storage arrays 106-1 through 106-M).

Similarly, although the resource registration module 116 and the reactive action initiation module 118 are shown as being implemented internal to the host device 102-1, the resource registration module 116 and the reactive action initiation module 118 may be implemented at least in part external to the host device 102-1, such as on or using an external server, a cloud-based computing platform, etc. It should also be appreciated that in some embodiments one or more other ones of the host devices 102-2 through 102-N may implement additional instances of the resource registration module 116 and the reactive action initiation module 118 (e.g., to register applications executing on such other ones of the host devices 102-2 through 102-N to receive invocation calls in response to resource state changes for host storage resources of one or more of the storage arrays 106).

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 and other portions of the system 100, such as the host devices 102, may in some embodiments be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 7 and 8.

It is to be understood that the particular set of elements shown in FIG. 1 for providing resource state change invocation calls from assets to applications to enable the applications to initiate reactive actions in response to resource state changes of the assets is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for providing resource state change invocation calls from assets to applications to enable the applications to initiate reactive actions in response to resource state changes of the assets will now be described in more detail with reference to the flow diagram of FIG. 2. It is to be understood that this particular process is only an example, and that additional or alternative processes for providing resource state change invocation calls from assets to applications to enable the applications to initiate reactive actions in response to resource state changes of the assets may be used in other embodiments.

In this embodiment, the process includes steps 200 through 208. These steps are assumed to be performed by the host device 102-1 and the storage array 106-1 utilizing the application registration module 112, the resource state change invocation module 114, the resource registration module 116 and the reactive action initiation module 118. The process begins with step 200, registering one or more applications to receive resource state change invocation calls from one or more assets of an information technology (IT) infrastructure. The one or more assets may comprise at least one of one or more physical computing resources and one or more virtual computing resources in the IT infrastructure, and the one or more applications are configured to provide management of said at least one of the one or more physical computing resources and the one or more virtual computing resources in the IT infrastructure. The IT infrastructure may comprise a storage ecosystem, the one or more assets of the IT infrastructure may comprise one or more storage systems in the storage ecosystem, and the one or more applications may be configured to provide management of storage resources of the one or more storage systems in the storage ecosystem.

Step 200 may include, for the given application, receiving at the given asset a secure key generated by the given application, the secure key being utilized in resource state change invocation calls provided from the given asset to the given application. Step 200 may also or alternatively include, for the given application, receiving at the given asset address information specifying one or more ports and a uniform resource identifier (URI) for the given application, wherein resource state change invocation calls are provided from the given asset to the given application using the specified one or more ports and the URI.

Step 200 may further or alternatively include specifying a payload format for resource state change invocation calls provided from the given asset to the given application. The specified payload format may comprise a JavaScript Object Notation (JSON) payload format comprising a key parameter, the key parameter identifying a key provided to the given asset by the given application as part of registering the given application with the given asset, the key parameter being utilized to validate payloads of resource state change invocation calls provided from the given asset to the given application. Step 200 may also or alternatively include, for the given application and the given asset, specifying one or more application programming interfaces (APIs) to be utilized for resource state change invocation calls provided from the given asset to the given application. The specified one or more APIs may comprise one or more Representational State Transfer (REST) commands of one or more REST APIs exposed by at least one of the given asset and the given application.

Figure 2:
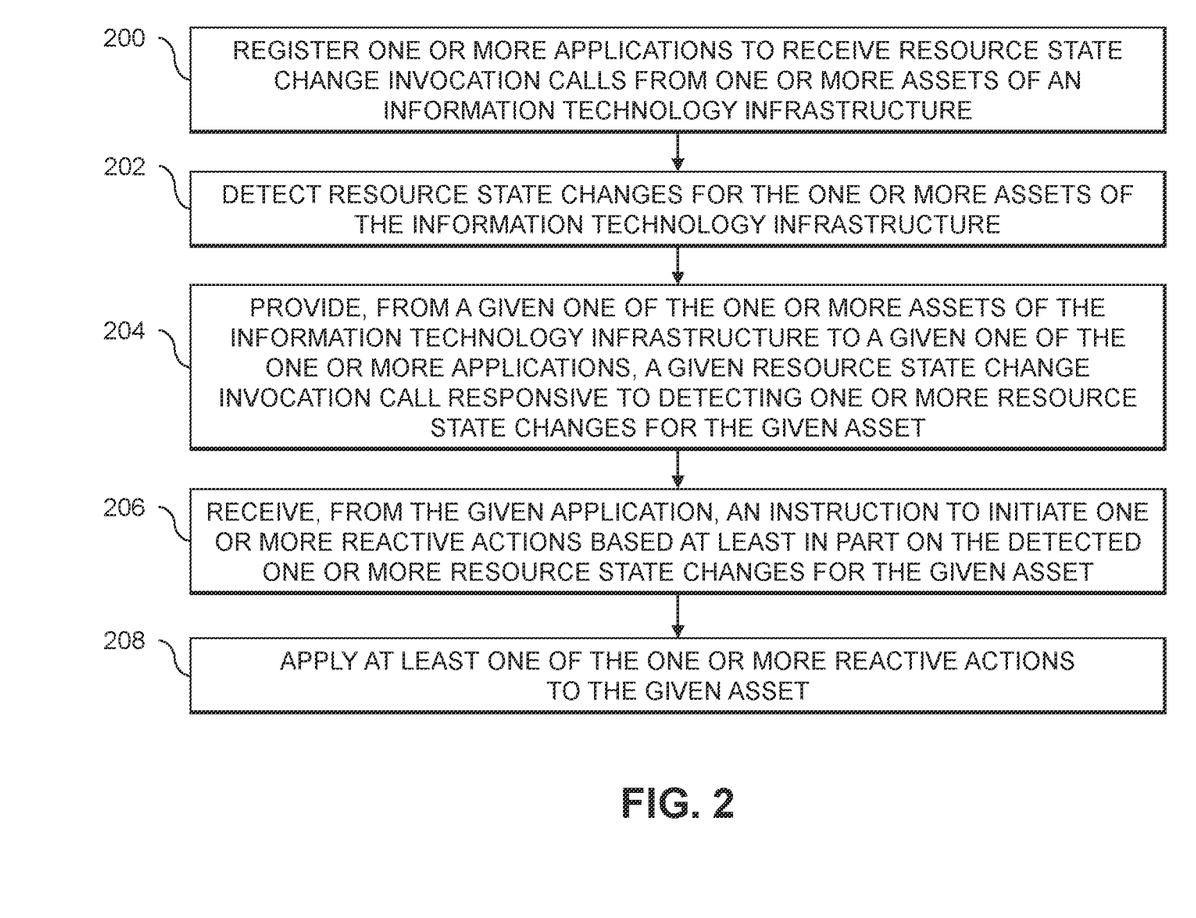
FIG. 2 is a flow diagram of an exemplary process for providing resource state change invocation calls from assets to applications to enable the applications to initiate reactive actions in response to resource state changes of the assets in an illustrative embodiment.

The FIG. 2 process continues with step 202, detecting resource state changes for the one or more assets of the information technology infrastructure. In step 204, a given resource state change invocation call is provided from a given one of the one or more assets of the IT infrastructure to a given one of the one or more applications responsive to detecting one or more resource state changes for the given asset. The given resource state change invocation call may be provided from the given asset to the given application in step 204 in real time responsive to detecting the one or more resource state changes for the given asset in step 202. The given resource state change invocation call may be provided from the given asset to the given application in step 204 in a push notification responsive to detecting the one or more resource state changes for the given asset in step 202.

In step 206, an instruction to initiate one or more reactive actions is received from the given application based at least in part on the detected one or more resource state changes for the given asset. At least one of the one or more reactive actions is applied to the given asset in step 208. The instruction to initiate the one or more reactive actions may be received in step 206 responsive to one or more of: validation by the given application of a secure key utilized in the given resource state change invocation call; the given application determining that one or more resource state changes identified in the given resource state change invocation call were not initiated by the given application; and the given application determining that one or more resource state changes identified in the given resource state change invocation call are associated with one or more resources of the given asset being managed by the given application.

In an information technology (IT) infrastructure, there may be a number of assets (e.g., physical and virtual computing resources) as well as various enabling software that co-exist with such assets. Such enabling software, in some cases, may run on the assets themselves, on an external server or system, on host or client devices that access the assets of the IT infrastructure, etc. Consider, as an example, a storage ecosystem, where there is various enabling software and appliances that co-exist with one or more storage systems. The storage ecosystem may include various types of storage systems (e.g., Dell Technologies storage systems such as PowerMAX, PowerStore, XtremIO, etc.) as well as various software (e.g., Dell Technologies software such as AppSync™, Storage Resource Manager (SRM), ViPR Controller, PowerPath, etc.) and appliances (e.g., Dell Technologies appliances such as VPLEX™, RecoverPoint, etc.) that co-exist to provide end-users with integrated storage solutions. In such ecosystems, the "consumer" (e.g., software or appliances in the ecosystem) is dependent on and acts in the interest of host (e.g., storage system) resources. For example, AppSync software may communicate with a PowerStore storage system to create snapshots or clones.

In such environments, however, there may be a gap in performing reactive computing across the products of the ecosystem. There is therefore a need for a solution that provides instant propagation of resource state changes on storage systems (or other assets in an IT infrastructure) to the consumer software. Such solutions can have significant positive impacts on the integration and user experience of the ecosystem. Consider, for example, if AppSync software could instantly react to some storage system resource state change (e.g., a volume or volume group family migration between appliances on a PowerStore cluster, a snapshot/ clone expiration, etc.) and immediately take appropriate action in accordance with its use cases (e.g., to reflect the migration or expiration changes). As another example, consider a layout change in a PowerStore cluster where volumes are removed from a storage group. Software such as PowerPath may want to change its cleanup script based on such changes, and AppSync may want to invoke this new PowerPath script for its use cases. If both AppSync and PowerPath are invoked when layout changes happen at the PowerStore end, then both AppSync and PowerPath could react to the changes with any required procedural execution to keep the ecosystem instantly balanced. As a further example, if AppSync can instantly react to a volume threshold limit being reached on a PowerMax volume or a change in Quality of Service (QoS) policy of an XtremIO volume, this can positively impact the ecosystem software user experience.

Conventional approaches fail to provide solutions for instantly integrating ecosystem products using a reactive ecosystem model, such as a model similar in some respects to reactive computing in traditional software. Instead, conventional approaches may adopt latent methods for integration of resource state changes. Such latent methods include, for example, event query and event polling, nightly or other periodic maintenance thread logic, scheduled storage or other asset rediscovery logic, etc., which is performed at the consumer software end.

Figure 3:
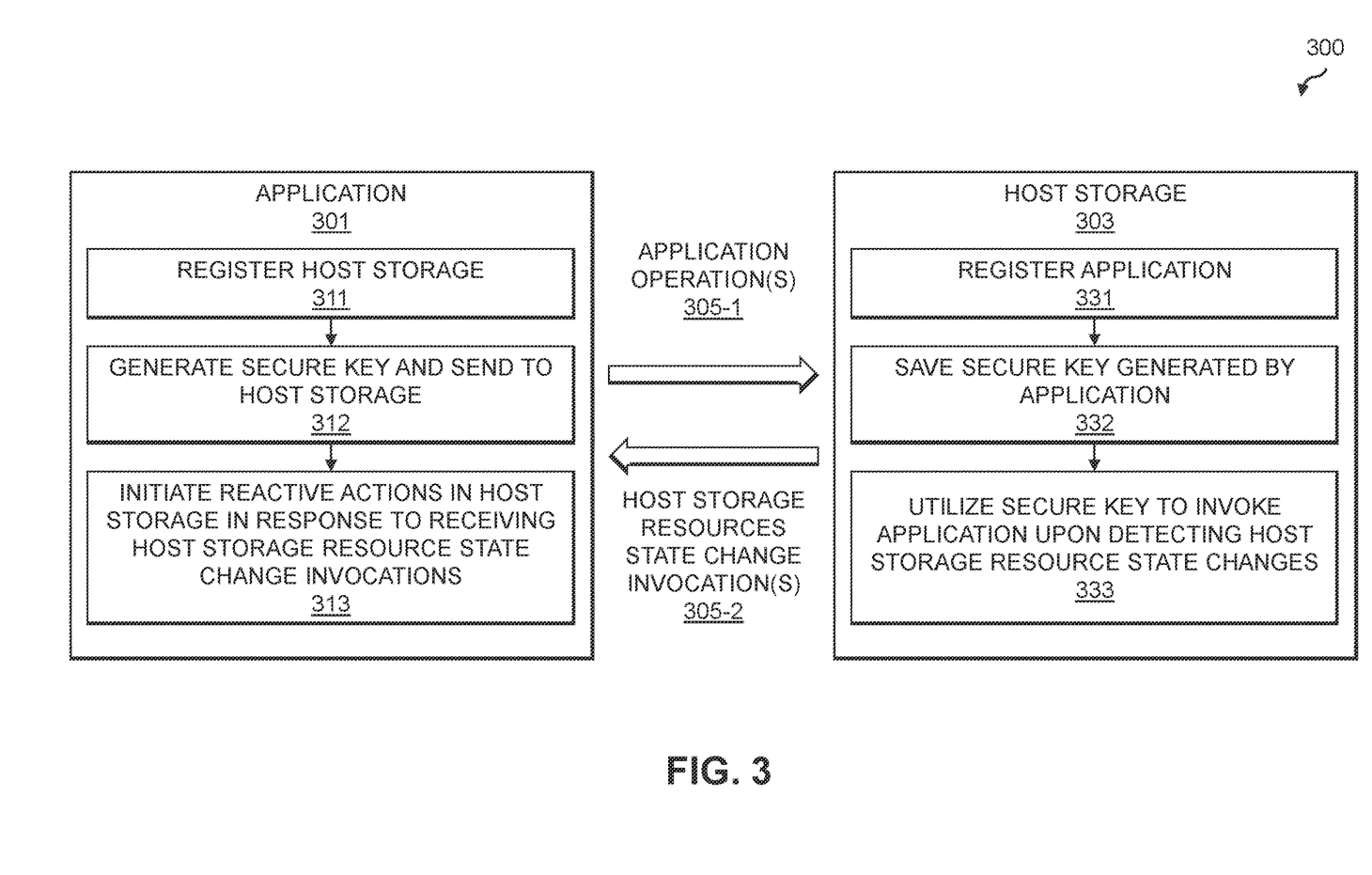
FIG. 3 shows reactive communications between an application and host storage in an illustrative embodiment.

FIG. 3 illustrates a system 300 providing a solution for lightweight reactive communication between an application 301 (e.g., software or an appliance in a storage ecosystem, also referred to herein as a consumer application or simply a consumer) and host storage 303 (e.g., a storage system in the storage ecosystem). Such lightweight reactive communication may involve utilization of one or more Representational State Transfer (REST) or other application programming interfaces (APIs). Such REST APIs, for example, may be used to communicate application operations 305-1 from the application 301 to the host storage 303, and to communicate host storage resource state change invocations 305-2 from the host storage 303 to the application 301. The application 301 is configured to register the host storage 303 in step 311, and generate and send a secure key to the host storage 303 in step 312. In step 313, the application 301 initiates reactive actions in the host storage 303 in response to receiving host storage resource state change invocations from the host storage 303. The host storage 303 is configured to register the application 301 in step 331, and to save the secure key generated by the application 301 in step 332. In step 333, the host storage 303 utilizes the secure key to invoke the application 301 upon detection of host storage resource state changes.

Consider, as an example, a storage ecosystem in which the application 301 is AppSync and the host storage 303 is a PowerStore storage system. The PowerStore storage system is registered in AppSync using management server user credentials, and AppSync can perform the application operations 305-1 using PowerStore REST API commands. AppSync registers itself with the PowerStore storage system to receive resource state change notifications. AppSync may also send a request to the PowerStore storage system to register for notifications of resource state changes. AppSync generates a unique, secure key and sends it to the PowerStore storage system for future use. Upon receiving resource state change invocations from the PowerStore storage system (e.g., snapshot deletion), AppSync can initiate respective reactive actions in the PowerStore storage system or elsewhere in the storage ecosystem (e.g., an application copy corresponding to the deleted snapshot will be expired). The PowerStore storage system registers AppSync (e.g., using a server name, user name and password, HyperText Transfer Protocol Secure (HTTPS) port and uniform resource identifier (URI) to send notifications or invocations to). The PowerStore storage system also saves the secure key generated by the AppSync user, and uses the secure key when invoking AppSync in the future upon any relevant resource state change. The payload sent to AppSync is in a predefined format (e.g., which may be contracted or otherwise agreed upon by AppSync and the PowerStore storage system), and AppSync implements a REST API to accept the payload in that predefined format.

Figure 4:
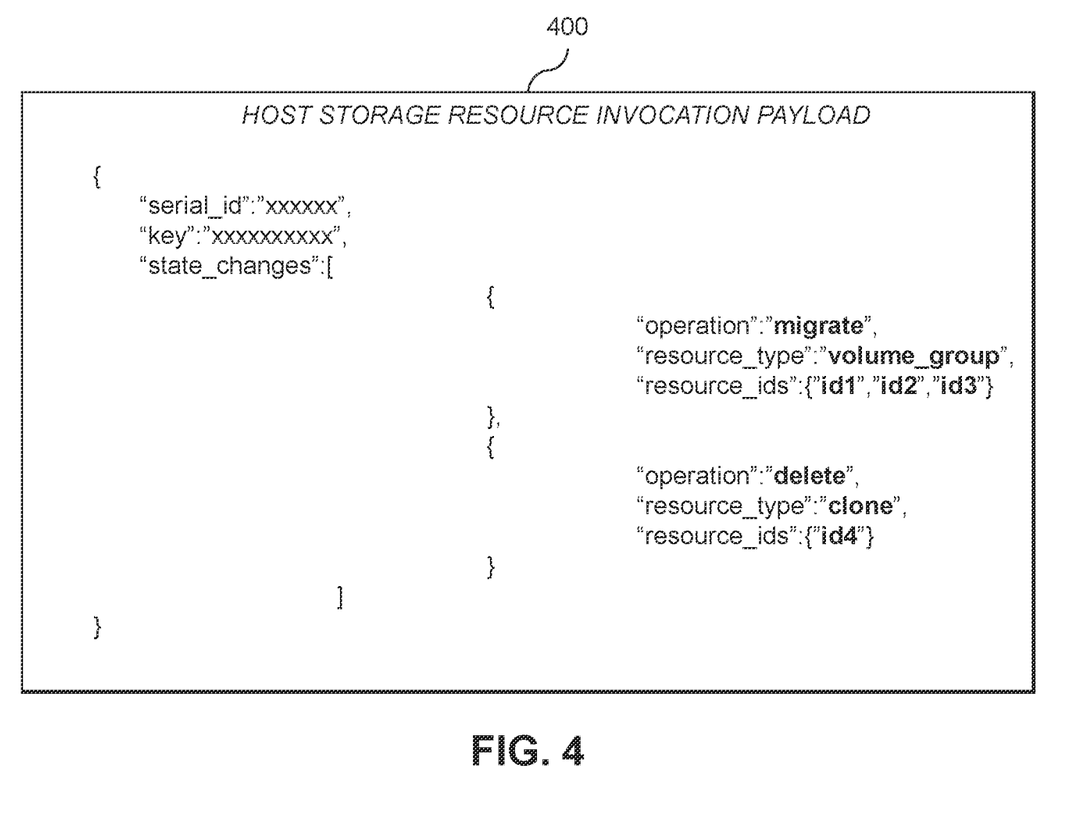
FIG. 4 shows an example payload format for a resource state change invocation call in an illustrative embodiment.

FIG. 4 shows an example host storage resource invocation payload 400 in a JavaScript Object Notation (JSON) format. Continuing with the example above, the host storage 303 (e.g., a PowerStore storage system) may communicate the payload 400 to the application 301 (e.g., AppSync software) on detecting resource state changes. Based on the payload 400 sent by the host storage 303, the consumer application 301 will take necessary action after canceling or filtering out loopback state changes. Loopback state changes, in the payload 400, may refer to a situation in which the consumer application 301 (e.g., AppSync) initiated deletion of the clone "id4." If this is the case, then the consumer application 301 will ignore the same in the payload 400, as it is already aware of that resource state change. The "key" parameter in the payload 400 may comprise the secure key that is generated by the consumer application 301 when registering itself for resource state change alerts from the host storage 303. This key usage avoids misuse of the REST or other API calls by potentially malicious users that are aware of the storage system serial ID and consumer details, but are not authorized to perform invocation calls. It should be noted that the secure key can be kept dynamic (e.g., the key may be changed or refreshed at regular intervals or in response to some event such as a user request, with such key changes being communicated to the host storage 303).

Figure 5:
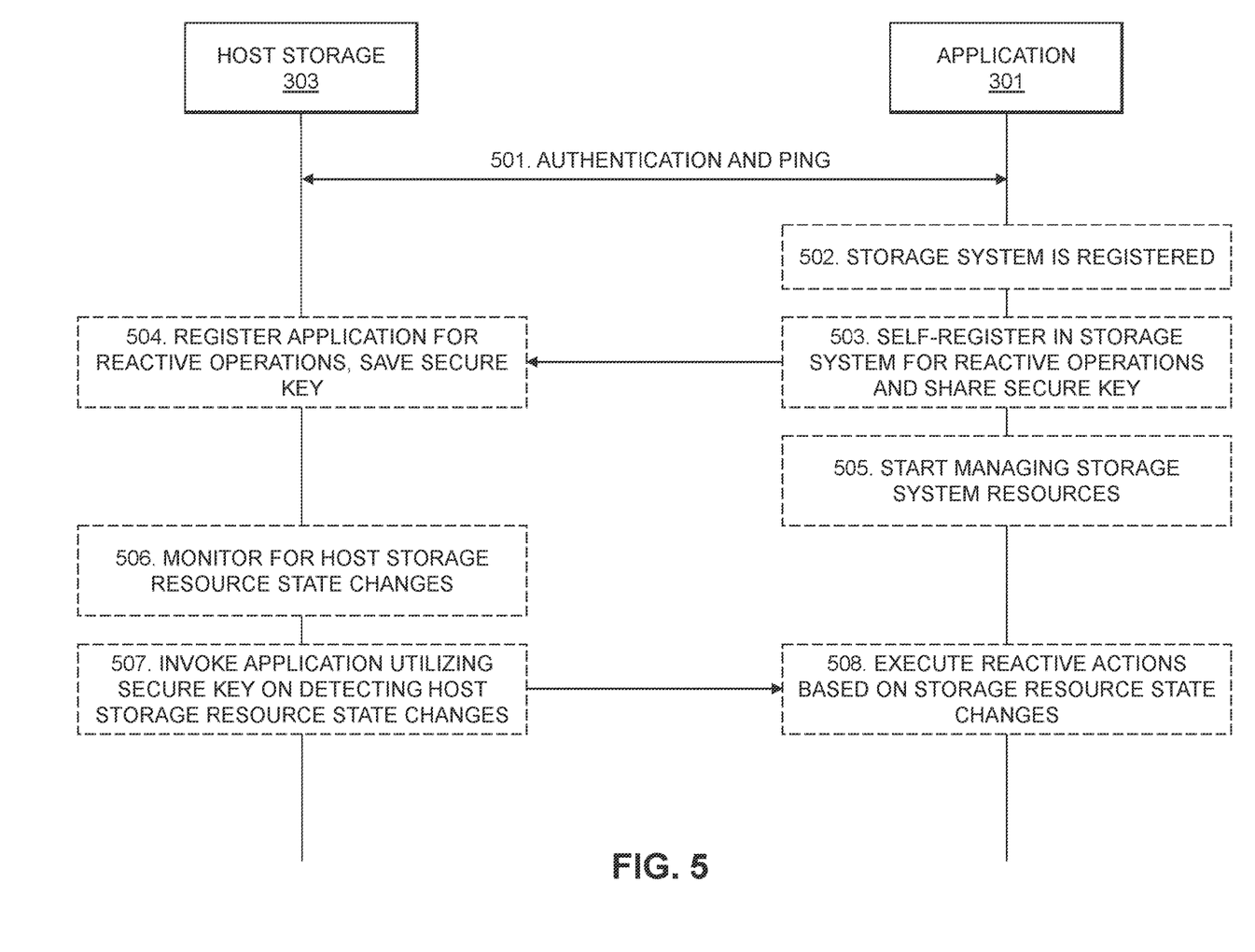
FIG. 5 shows a process flow for generating invocation calls in response to storage resource state changes in an illustrative embodiment.

FIG. 5 shows a process flow for invoking applications in a storage ecosystem based on storage resource state changes. In step 501, the application 301 and host storage 303 perform authentication and ping one another. In step 502, the application 301 determines that the storage system (of the host storage 303) is registered. In step 503, the application 301 self-registers in the storage system for reactive operations and shares a secure key with the host storage 303. In step 504, the host storage 303 registers the application 301 for reactive operations, and saves the secure key for the application 301. The application 301 then starts managing storage system resources in step 505 and the host storage 303 starts to monitor for host storage 303 resource state changes in step 506. The host storage 303 in step 507 invokes the application 301 utilizing the secure key on detecting host storage 303 resource state changes. In step 508, the application 301 then executes reactive actions based on the storage resource state changes. The reactive actions may, in some cases, be initiated or executed on the application 301 itself, on the host storage 303, or on one or more other entities of the storage ecosystem (e.g., on one or more other applications and/or appliances, on other storage systems, etc.).

Figure 6:
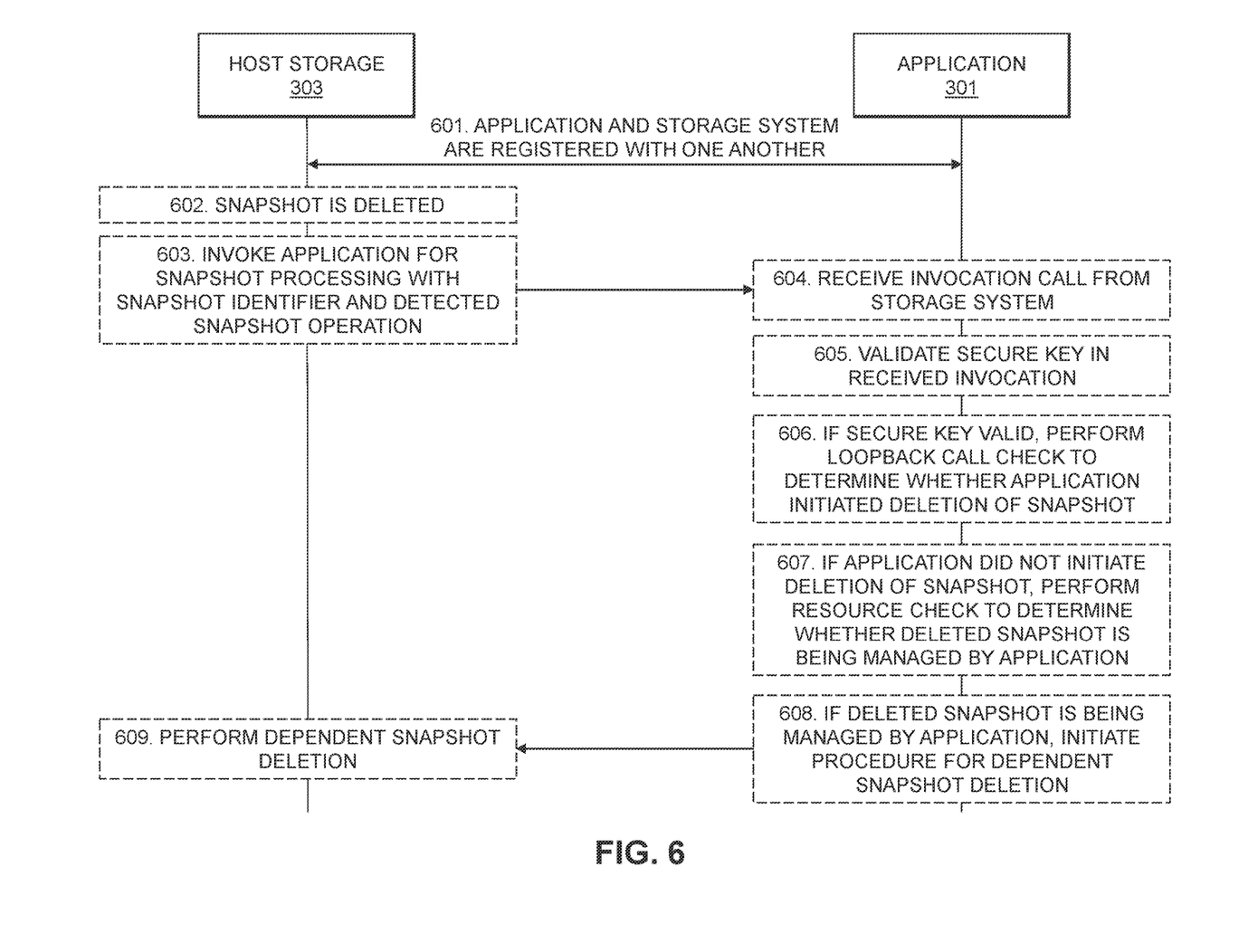
FIG. 6 shows another process flow for generating invocation calls in response to storage resource state changes in an illustrative embodiment.

FIG. 6 shows another process flow for invoking applications in a storage ecosystem based on storage resource state changes. More particularly, FIG. 6 shows an example illustrating how a snapshot deleted on a storage array or storage system invokes reactive actions in ecosystem software. In step 601, the application 301 and host storage 303 are registered with one another. In step 602, the host storage 303 deletes a snapshot. The host storage 303 then invokes the storage ecosystem software (e.g., the application 301) in step 603 for snapshot processing. The step 603 invocation will utilize the secure key of the application 301 (e.g., assumed to be previously provided as part of the registration in step 601, such as using the FIG. 5 process flow). The step 603 invocation will specify a snapshot ID as well as the operations performed on the snapshot, which in the FIG. 6 example is deletion of the snapshot.

In step 604, the application 301 receives the invocation call from the host storage 303. In step 605, the application 301 validates the secure key in the invocation call received in step 604. If the secure key is not valid, the invocation call received in step 604 will be ignored. If the secure key is valid, the application 301 in step 606 performs a loopback call check. The loopback call check includes determining whether the application 301 itself initiated the snapshot operation identified in the invocation call received in step 604 (e.g., whether the application 301 itself performed deletion of the snapshot identified by the snapshot ID included in the step 604 invocation call). If the loopback call check indicates that the application 301 is the one that initiated deletion of the snapshot, then the application 301 will ignore the invocation call received in step 604. Otherwise, the application 301 in step 607 performs a resource check to determine whether the deleted snapshot was managed by the application 301 (e.g., by matching or comparing the snapshot ID in the step 604 invocation call to a list of snapshot IDs managed by the application 301).

If the deleted snapshot is not being managed by the application 301, the step 604 invocation call will be ignored. If the deleted snapshot is being managed by the application 301, then the application in step 608 will initiate procedures for dependent snapshot deletion. The dependent snapshot deletion may be performed by the host storage 303 in step 609. It should be noted, however, that the dependent snapshots may be located on a different storage system other than the host storage 303 and thus step 609 may be performed in part by such other storage systems. Further, dependent snapshot deletion may also involve applications in the storage ecosystem other than the application 301, and thus step 609 may be performed in part by such other applications. Consider, as an example, that the application 301 is AppSync which invokes application copy expiry which will expire one or more copies that are dependent on the snapshot which was deleted. AppSync may also delete other snapshots that are part of the same application copy, and possibly expire an associated application copy catalog.

Illustrative embodiments provide various advantages relative to conventional approaches. For example, some conventional approaches utilize subscription-based notifications (e.g., Common Information Model (CIM) indications) from a host system (e.g., that contains resources or performs processes). However, such approaches only provide subscription-based notifications and thus fail to provide reactive models across an IT infrastructure (e.g., a storage ecosystem that includes various storage systems, applications, appliances, etc.).

CIM indications are based on a CIM object model, and require both subscribing and indicating applications to be built to understand or respond with the same model. In contrast, illustrative embodiments provide a solution that can leverage existing and heterogeneous methodologies for delivering notifications and invocations. Further, conventional subscription-based notification approaches only provide indications, whereas illustrative embodiments provide solutions that enable invocations. Thus, illustrative embodiments can advantageously enable host systems (e.g., storage systems in a storage ecosystem) not only to generate and send notifications (e.g., to applications and appliances in the storage ecosystem), but also to invoke actions (e.g., on the applications and appliances in the storage ecosystem).

Illustrative embodiments also advantageously enable ecosystem software instances to self-register and get invocations securely, providing secure inter-application integration that helps to avoid invocation of ecosystem software by unintended and potentially malicious parties. Further, the reactive storage or other ecosystem model enables instant change propagation capability with respect to host system resource states. This enables cohesive ecosystems, as well as optimal and efficient operations of ecosystem software with respect to resource state changes occurring in host systems inside an ecosystem. Further, end-users have an enhanced user experiences with the ecosystem.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for providing resource state change invocation calls from assets to applications to enable the applications to initiate reactive actions in response to resource state changes of the assets will now be described in greater detail with reference to FIGS. 7 and 8. Although described in the context of system 100, these platforms may also be used to implement at least portions of other information processing systems in other embodiments.

Figure 7:
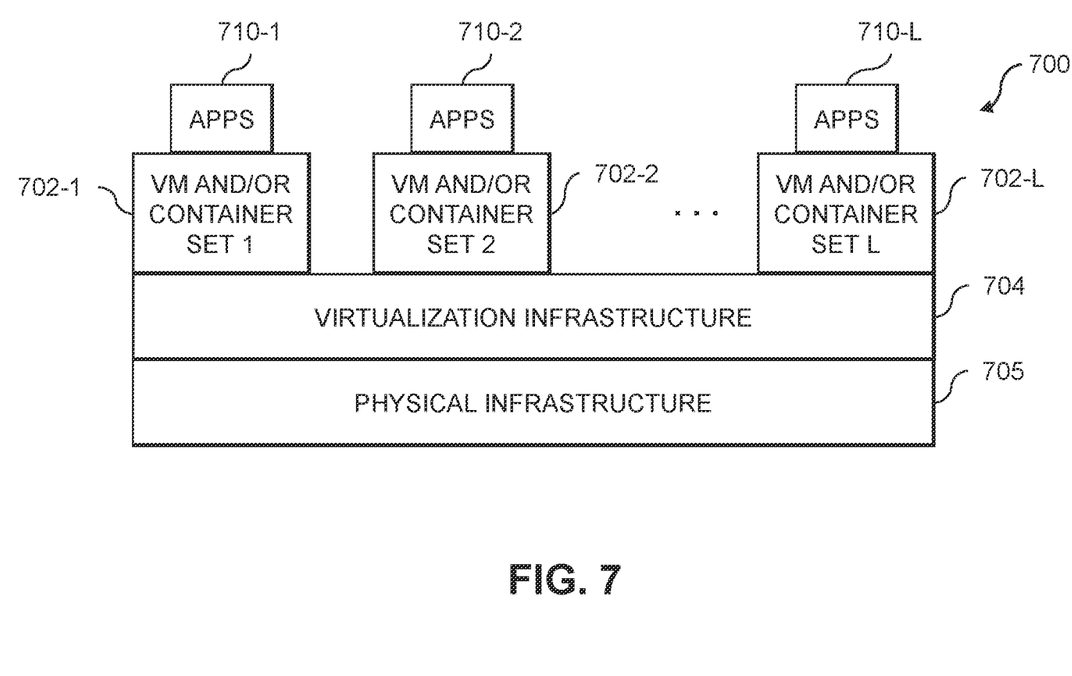
FIGS. 7 and 8 show examples of processing platforms that may be utilized to implement at least a portion of an information processing system in illustrative embodiments.
Figure 8:
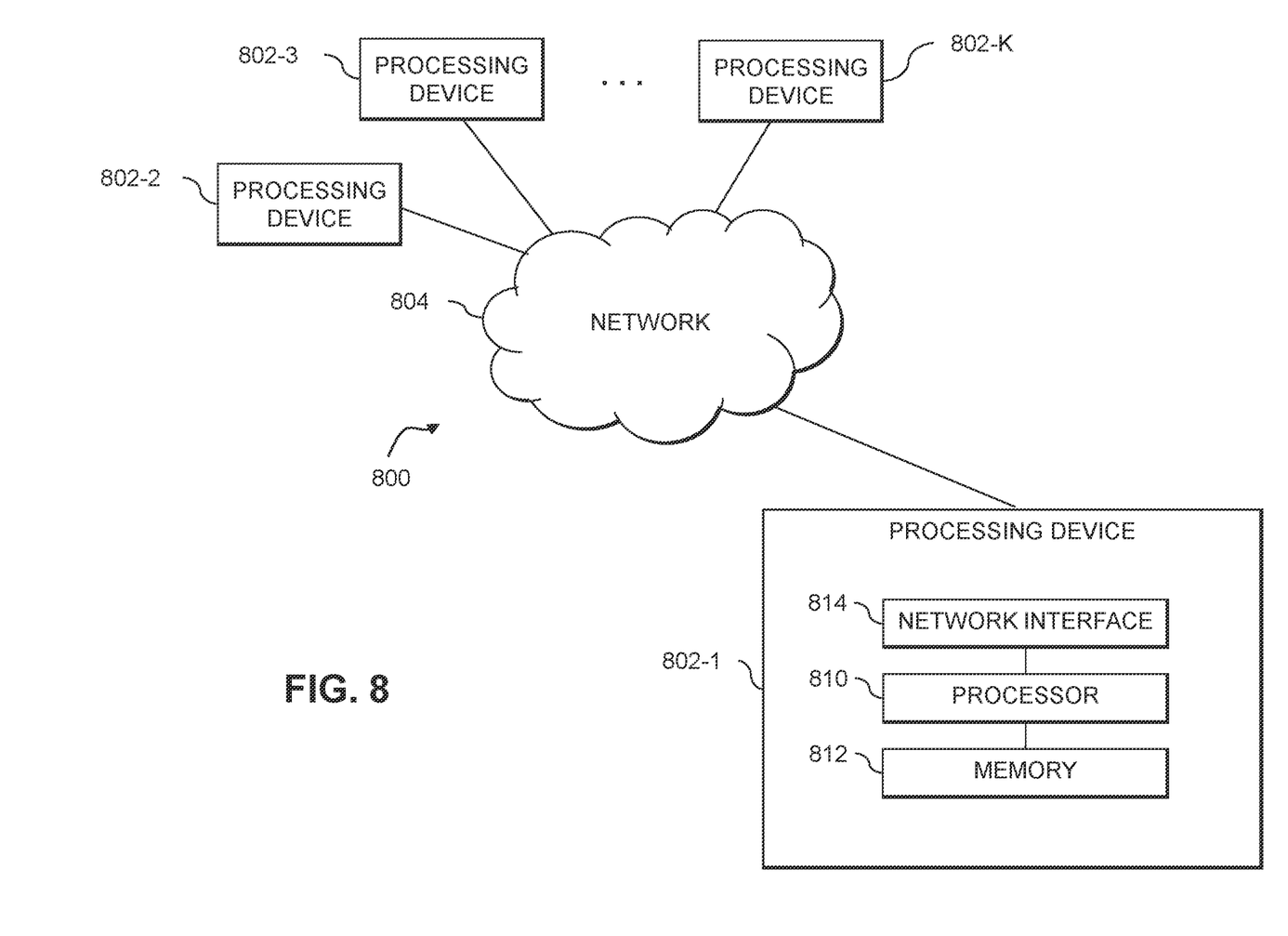

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for providing resource state change invocation calls from assets to applications to enable the applications to initiate reactive actions in response to resource state changes of the assets as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, applications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
   registering one or more applications to receive resource state change invocation calls from one or more assets of an information technology infrastructure;
   detecting resource state changes for the one or more assets of the information technology infrastructure;
   providing, from a given one of the one or more assets of the information technology infrastructure to a given one of the one or more applications, a given resource state change invocation call responsive to detecting one or more resource state changes for the given asset;
   receiving, from the given application, an instruction to initiate one or more reactive actions based at least in part on the detected one or more resource state changes for the given asset; and
   applying at least one of the one or more reactive actions to the given asset;
wherein receiving, from the given application, the instruction to initiate the one or more reactive actions is responsive to validation by the given application of a secure key utilized in the given resource state change invocation call;

wherein the secure key is generated by the given application and provided to the given asset as part of registering the given application to receive resource state change invocation calls from the given asset;
wherein said at least one of the one or more reactive actions is associated with a given resource of the given asset; and
wherein applying said at least one of the one or more reactive actions to the given asset is responsive to (i) validating that the given application is registered to manage the given resource of the given asset and (ii) validating that said at least one of the one or more reactive actions is initiated by at least one entity other than the given application.

2. The apparatus of claim 1 wherein the one or more assets comprise at least one of one or more physical computing resources and one or more virtual computing resources in the information technology infrastructure, and wherein the one or more applications are configured to provide management of said at least one of the one or more physical computing resources and the one or more virtual computing resources in the information technology infrastructure.

3. The apparatus of claim 1 wherein the information technology infrastructure comprises a storage ecosystem, wherein the one or more assets of the information technology infrastructure comprise one or more storage systems in the storage ecosystem, and wherein the one or more applications are configured to provide management of storage resources of the one or more storage systems in the storage ecosystem.

4. The apparatus of claim 1 wherein registering the one or more applications to receive resource state change invocation calls from the one or more assets of the information technology infrastructure comprises, for the given application, receiving at the given asset the secure key generated by the given application, the secure key being utilized in resource state change invocation calls provided from the given asset to the given application.

5. The apparatus of claim 1 wherein registering the one or more applications to receive resource state change invocation calls from the one or more assets of the information technology infrastructure comprises, for the given application, receiving at the given asset address information specifying one or more ports and a uniform resource identifier for the given application, wherein resource state change invocation calls are provided from the given asset to the given application using the specified one or more ports and the uniform resource identifier.

6. The apparatus of claim 1 wherein registering the one or more applications to receive resource state change invocation calls from the one or more assets of the information technology infrastructure comprises specifying a payload format for resource state change invocation calls provided from the given asset to the given application.

7. The apparatus of claim 6 wherein the specified payload format comprises a JavaScript Object Notation (JSON) payload format comprising a key parameter, the key parameter identifying the secure key provided to the given asset by the given application as part of registering the given application with the given asset, the key parameter being utilized to validate payloads of resource state change invocation calls provided from the given asset to the given application.

8. The apparatus of claim 1 wherein registering the one or more applications to receive resource state change invocation calls from the one or more assets of the information technology infrastructure comprises, for the given application and the given asset, specifying one or more application programming interfaces to be utilized for resource state change invocation calls provided from the given asset to the given application.

9. The apparatus of claim 8 wherein the specified one or more application programming interfaces comprise one or more Representational State Transfer (REST) commands of one or more REST application programming interfaces exposed by at least one of the given asset and the given application.

10. The apparatus of claim 1 wherein the given resource state change invocation call is provided from the given asset to the given application in real time responsive to detecting the one or more resource state changes for the given asset.

11. The apparatus of claim 1 wherein the given resource state change invocation call is provided from the given asset to the given application in a push notification responsive to detecting the one or more resource state changes for the given asset.

12. The apparatus of claim 1 wherein the secure key generated by the given application for the given asset is different than one or more additional secure keys generated by the given application for one or more additional assets registered with the given application which are configured to provide resource state invocation calls to the given application.

13. The apparatus of claim 1 wherein the at least one processing device is further configured to apply one or more of the reactive actions to one or more additional assets other than the given asset.

14. The apparatus of claim 1 wherein at least one of the resource state changes for the given asset comprises deletion of a given snapshot, and wherein said at least one of the one or more reactive actions comprises deletion of one or more additional snapshots which are dependent on the given snapshot.

15. A computer program product comprising a non-transitory processor-readable storage medium having stored therein program code of one or more software programs, wherein the program code when executed by at least one processing device causes the at least one processing device to perform steps of:
registering one or more applications to receive resource state change invocation calls from one or more assets of an information technology infrastructure;
detecting resource state changes for the one or more assets of the information technology infrastructure;
providing, from a given one of the one or more assets of the information technology infrastructure to a given one of the one or more applications, a given resource state change invocation call responsive to detecting one or more resource state changes for the given asset;
receiving, from the given application, an instruction to initiate one or more reactive actions based at least in part on the detected one or more resource state changes for the given asset; and
applying at least one of the one or more reactive actions to the given asset;
wherein receiving, from the given application, the instruction to initiate the one or more reactive actions is responsive to validation by the given application of a secure key utilized in the given resource state change invocation call;
wherein the secure key is generated by the given application and provided to the given asset as part of registering the given application to receive resource state change invocation calls from the given asset;

wherein said at least one of the one or more reactive actions is associated with a given resource of the given asset; and wherein applying said at least one of the one or more reactive actions to the given asset is responsive to (i) validating that the given application is registered to manage the given resource of the given asset and (ii) validating that said at least one of the one or more reactive actions is initiated by at least one entity other than the given application.

16. The computer program product of claim 15 wherein the information technology infrastructure comprises a storage ecosystem, wherein the one or more assets of the information technology infrastructure comprise one or more storage systems in the storage ecosystem, and wherein the one or more applications are configured to provide management of storage resources of the one or more storage systems in the storage ecosystem.

17. The computer program product of claim 15 wherein registering the one or more applications to receive resource state change invocation calls from the one or more assets of the information technology infrastructure comprises, for the given application, receiving at the given asset the secure key generated by the given application, the secure key being utilized in resource state change invocation calls provided from the given asset to the given application.

18. A method comprising:
registering one or more applications to receive resource state change invocation calls from one or more assets of an information technology infrastructure;
detecting resource state changes for the one or more assets of the information technology infrastructure;
providing, from a given one of the one or more assets of the information technology infrastructure to a given one of the one or more applications, a given resource state change invocation call responsive to detecting one or more resource state changes for the given asset;
receiving, from the given application, an instruction to initiate one or more reactive actions based at least in part on the detected one or more resource state changes for the given asset; and
applying at least one of the one or more reactive actions to the given asset;
wherein receiving, from the given application, the instruction to initiate the one or more reactive actions is responsive to validation by the given application of a secure key utilized in the given resource state change invocation call;
wherein the secure key is generated by the given application and provided to the given asset as part of registering the given application to receive resource state change invocation calls from the given asset;
wherein said at least one of the one or more reactive actions is associated with a given resource of the given asset;
wherein applying said at least one of the one or more reactive actions to the given asset is responsive to (i) validating that the given application is registered to manage the given resource of the given asset and (ii) validating that said at least one of the one or more reactive actions is initiated by at least one entity other than the given application; and
wherein the method is performed by at least one processing device comprising a processor coupled to a memory.

19. The method of claim 18 wherein the information technology infrastructure comprises a storage ecosystem, wherein the one or more assets of the information technology infrastructure comprise one or more storage systems in the storage ecosystem, and wherein the one or more applications are configured to provide management of storage resources of the one or more storage systems in the storage ecosystem.

20. The method of claim 18 wherein registering the one or more applications to receive resource state change invocation calls from the one or more assets of the information technology infrastructure comprises, for the given application, receiving at the given asset the secure key generated by the given application, the secure key being utilized in resource state change invocation calls provided from the given asset to the given application.

\* \* \* \* \*